United States Patent
Jaiswal et al.

(10) Patent No.: US 10,247,013 B2
(45) Date of Patent: Apr. 2, 2019

(54) INTERIOR COOLING CONFIGURATIONS IN TURBINE ROTOR BLADES

(71) Applicant: General Electric Company, Schenectady, NY (US)

(72) Inventors: Shashwat Swami Jaiswal, Karnataka (IN); Rohit Chouhan, Karnataka (IN)

(73) Assignee: General Electric Company, Schenectady, NY (US)

( * ) Notice: Subject to any disclaimer, the term of this patent is extended or adjusted under 35 U.S.C. 154(b) by 556 days.

(21) Appl. No.: 14/974,193

(22) Filed: Dec. 18, 2015

(65) Prior Publication Data

US 2017/0175536 A1    Jun. 22, 2017

(51) Int. Cl.
*F01D 5/22* (2006.01)
*F01D 5/14* (2006.01)
*F01D 5/18* (2006.01)

(52) U.S. Cl.
CPC ............ *F01D 5/187* (2013.01); *F01D 5/147* (2013.01); *F01D 5/225* (2013.01); *F05D 2220/32* (2013.01); *F05D 2240/305* (2013.01); *F05D 2240/306* (2013.01); *F05D 2250/711* (2013.01); *F05D 2250/712* (2013.01); *F05D 2260/20* (2013.01); *F05D 2260/202* (2013.01); *Y02T 50/671* (2013.01); *Y02T 50/673* (2013.01); *Y02T 50/676* (2013.01)

(58) Field of Classification Search
CPC ... F01D 5/18; F01D 5/187; F01D 5/20; F01D 5/225; F01D 11/08; F01D 11/10; F01D 11/12; F05D 2240/307; Y02T 50/676
See application file for complete search history.

(56) References Cited

U.S. PATENT DOCUMENTS

| 2,641,440 | A  | * | 6/1953  | Williams  | F01D 5/087 |
|-----------|----|---|---------|-----------|------------|
|           |    |   |         |           | 228/140    |
| 6,099,253 | A  |   | 8/2000  | Fukue et al. | |
| 6,152,695 | A  |   | 11/2000 | Fukue et al. | |
| 6,499,950 | B2 | * | 12/2002 | Willett   | F01D 5/182 |
|           |    |   |         |           | 416/97 R   |
| 7,334,993 | B2 | * | 2/2008  | Sekihara  | F01D 5/225 |
|           |    |   |         |           | 416/190    |

* cited by examiner

*Primary Examiner* — Jason D Shanske
*Assistant Examiner* — Brian O Peters
(74) *Attorney, Agent, or Firm* — Mark E. Henderson; Ernst G. Cusick; Frank A. Landgraff

(57) ABSTRACT

A turbine rotor blade that includes an airfoil defined between a concave pressure face and a laterally opposed convex suction face, and a cooling configuration that includes a cooling channel for receiving and directing a coolant through an interior of the rotor blade. The cooling channel may include fluidly connected segments, in which: a supply segment extends radially through the airfoil; an outlet segment discharges the coolant from the rotor blade at a shallow angle relative to a flow direction of a working fluid through the turbine; and an elbow segment connects the supply segment to the outlet segment and is positioned near the outboard tip of the airfoil. The elbow segment may be configured for accommodating a change of direction between the supply segment and the outlet segment.

20 Claims, 11 Drawing Sheets

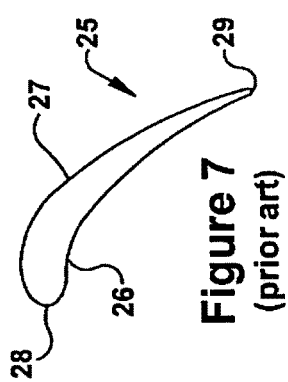
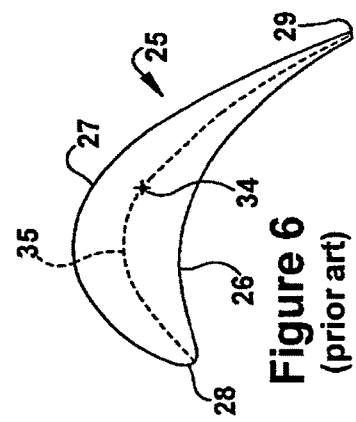
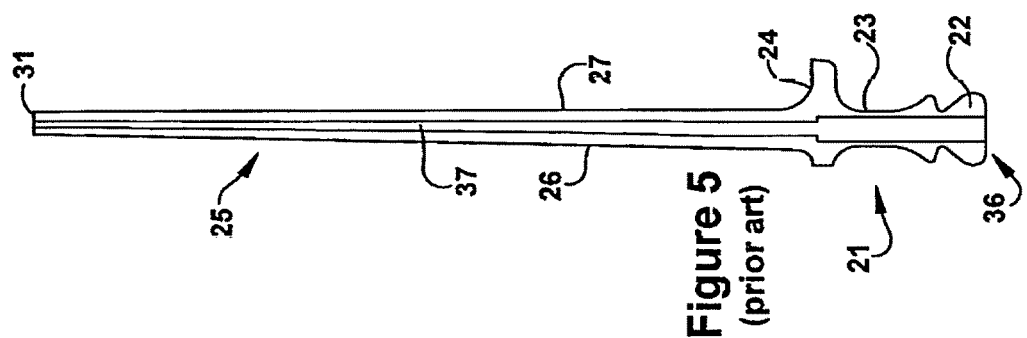
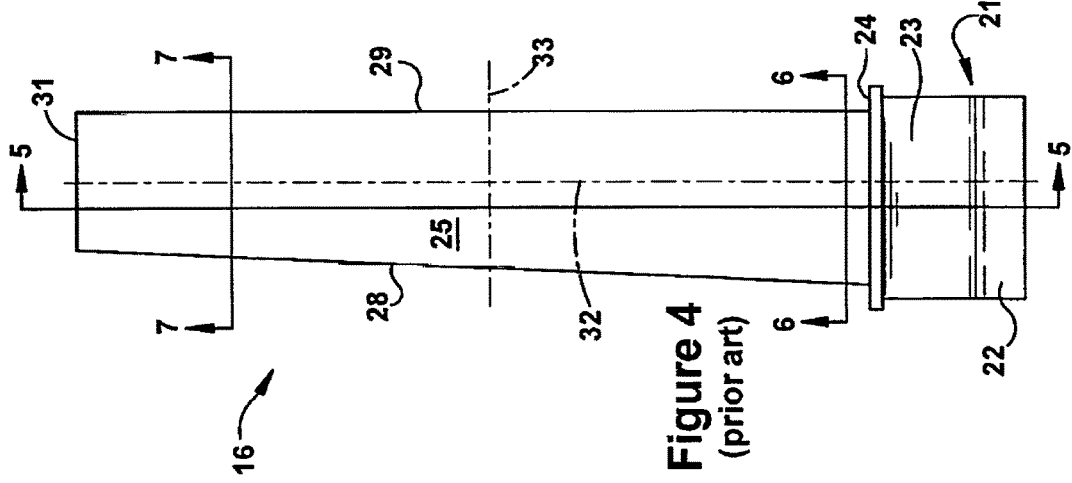

INTERIOR COOLING CONFIGURATIONS IN TURBINE ROTOR BLADES

BACKGROUND OF THE INVENTION

This present application relates to interior cooling channels and configurations of the blades in gas turbine engines. More specifically, but not by way of limitation, the present application relates to interior cooling channels and structural configurations formed near the outer radial tip of turbine rotor blades.

It will be appreciated that combustion or gas turbine engines ("gas turbines") include compressor and turbine sections in which rows of blades are axially stacked in stages. Each stage includes a row of circumferentially-spaced stator blades, which are fixed, and a row of rotor blades, which rotate about a central turbine axis or shaft. In operation, generally, the compressor rotor blades rotate about the shaft, and, acting in concert with the stator blades, compress a flow of air. The supply of compressed air then is used in a combustor to combust a supply of fuel. The resulting flow of hot expanding gases from the combustion, i.e., the working fluid, is expanded through the turbine section of the engine. The flow of working fluid through the turbine is redirected by the stator blades onto the rotor blades so to induce rotation. The rotor blades are connected to a central shaft such that the rotation of the rotor blades rotates the shaft. In this manner, the energy contained in the fuel is converted into the mechanical energy of the rotating shaft, which, for example, may be used to rotate the rotor blades of the compressor, such that the supply of compressed air needed for combustion is produced, and the coils of a generator, such that electrical power is generated. During operation, because of the extreme temperatures of the hot-gas path, the velocity of the working fluid, and the rotational velocity of the engine, the blades within the turbine become highly stressed with extreme mechanical and thermal loads.

The engineering of efficient and cost-effective gas turbines is an ongoing and significant objective. While several strategies for increasing the efficiency of gas turbines are known, it remains a challenging objective because such alternatives—which, for example, include increasing the size of the engine, increasing the temperatures through the hot-gas path, and increasing the rotational velocities of the rotor blades—generally place additional strain on blades and other hot-gas path components parts that are already highly stressed. As a result, improved apparatus, methods or systems that reduce operational stresses placed on turbine blades or allow the turbine blades to better withstand these stresses so that the engines may operate more efficiently remain a significant area for technological improvement.

One strategy for alleviating the stresses on the blades is through actively cooling them during operation. Such cooling may allow the blades to better withstand higher firing temperatures and mechanical stresses, which may extend the life of the blades and generally make the engine more cost-effective and efficient to operate. One way to cool blades during operation is through the use of internal cooling channels or circuits. Generally, this involves passing a relatively cool supply of compressed air derived from the compressor through internal cooling channels. For a number of reasons, as will be appreciated, great care is required in designing and manufacturing these interior cooling channels.

First, the use of cooling air decreases the efficiency of the engine. Specifically, air from the compressor that is diverted for cooling purposes is air that otherwise could be used in the combustion process. As a result, the usage of such air necessarily decreases the air available for combustion and, thereby, decreases overall efficiency. This mandates that cooling channels be highly efficient so that air usage for cooling is minimized. Second, newer turbine blade design calls for aggressively shaped, aerodynamic configurations, which are thinner and more curved or twisted. These new blade configurations place a further premium on compact and efficient channels. These new designs also create spatial constraints that hinder or constrain the manufacture of traditional cooling channel configurations using conventional approaches. Third, interior cooling channels must be configured to promote light-weight rotor blades while still providing robust enough structure for withstanding extreme loading. That is to say, while cooling channel design is an effective way to reduce the overall weight of the blade—which promotes efficiency and reduces mechanical loads—the blades must still remain very resilient. Cooling channels, therefore, must be designed to both remove material and weight while still promoting structural resilience. Internal arrangements must also avoid stress concentrations or inadequately cooled regions (or "hot spots") that may negatively impact part-life. Fourth, cooling configurations must also be designed so that discharged coolant promotes surface cooling and efficient, aerodynamic operation. Specifically, because cooling channels typically discharged coolant into the working fluid flowpath after circulating through the internal cooling channels, another design consideration concerns the use of discharged coolant for surface cooling as well as minimizing the aerodynamic loses associated therewith. The ejected coolant is often counted on to provide cooling to outer surfaces or regions of the blade after its release, and this must both dovetail with internal cooling strategies and take into account aerodynamic performance.

As will be appreciated, according to these and other criteria, the design of internal cooling configurations within turbine blades includes many complex, often competing considerations. Novel designs that balance these in a manner that optimizes or enhances one or more desired performance criteria—while still adequately promoting structural robustness, part-life longevity, cost-effective engine operation, and the efficient usage of coolant—represent significant technological advances.

BRIEF DESCRIPTION OF THE INVENTION

The present application thus describes a turbine rotor blade that includes an airfoil defined between a concave pressure face and a laterally opposed convex suction face, and a cooling configuration that includes a cooling channel for receiving and directing a coolant through an interior of the rotor blade. The cooling channel may include fluidly connected segments, in which: a supply segment extends radially through the airfoil; an outlet segment discharges the coolant from the rotor blade at a shallow angle relative to a flow direction of a working fluid through the turbine; and an elbow segment connects the supply segment to the outlet segment and is positioned near the outboard tip of the airfoil. The elbow segment may be configured for accommodating a change of direction between the supply segment and the outlet segment.

These and other features of the present application will become apparent upon review of the following detailed description of the preferred embodiments when taken in conjunction with the drawings and the appended claims.

BRIEF DESCRIPTION OF THE DRAWINGS

These and other features of this invention will be more completely understood and appreciated by careful study of the following more detailed description of exemplary embodiments of the invention taken in conjunction with the accompanying drawings, in which:

FIG. 4 is a side view of an exemplary turbine rotor blade that may include an internal cooling configuration and structural arrangement according to aspects and embodiments of the present application;

FIG. 5 is a section view along sight line 5-5 of FIG. 4;

FIG. 6 is a section view along sight line 6-6 of FIG. 4;

FIG. 7 is a section view along sight line 7-7 of FIG. 4;

DETAILED DESCRIPTION OF THE INVENTION

Figure 1:
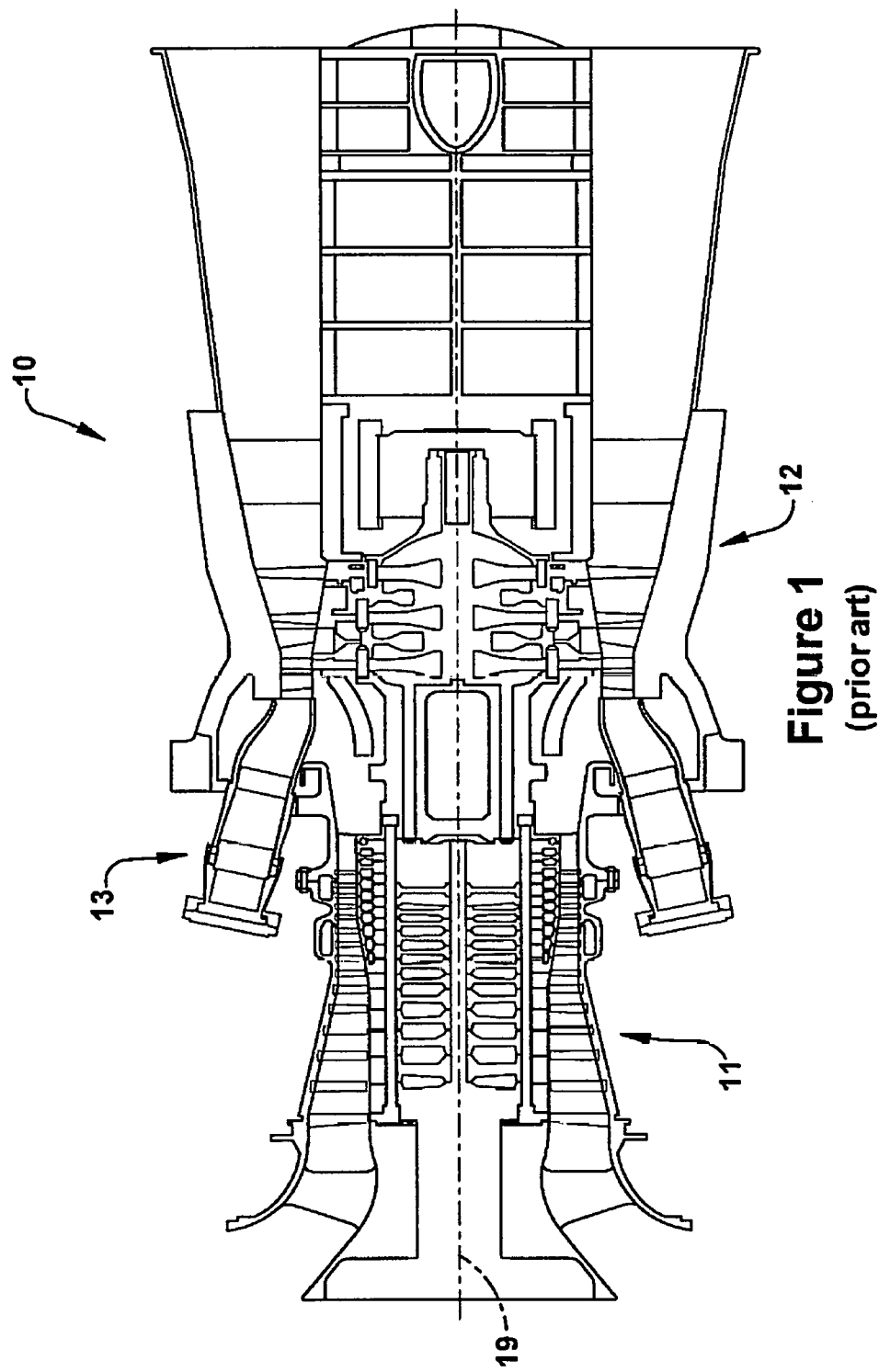
FIG. 1 is a schematic representation of an exemplary gas turbine that may include turbine blades according to aspects and embodiments of the present application.

Aspects and advantages of the present application are set forth below in the following description, or may be obvious from the description, or may be learned through practice of the invention. Reference will now be made in detail to present embodiments of the invention, one or more examples of which are illustrated in the accompanying drawings. The detailed description uses numerical designations to refer to features in the drawings. Like or similar designations in the drawings and description may be used to refer to like or similar parts of embodiments of the invention. As will be appreciated, each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. It is intended that the present invention covers such modifications and variations as come within the scope of the appended claims and their equivalents. It is to be understood that the ranges and limits mentioned herein include all sub-ranges located within the prescribed limits, inclusive of the limits themselves unless otherwise stated. Additionally, certain terms have been selected to describe the present invention and its component subsystems and parts. To the extent possible, these terms have been chosen based on the terminology common to the technology field. Still, it will be appreciate that such terms often are subject to differing interpretations. For example, what may be referred to herein as a single component, may be referenced elsewhere as consisting of multiple components, or, what may be referenced herein as including multiple components, may be referred to elsewhere as being a single component. In understanding the scope of the present invention, attention should not only be paid to the particular terminology used, but also to the accompanying description and context, as well as the structure, configuration, function, and/or usage of the component being referenced and described, including the manner in which the term relates to the several figures, as well as, of course, the precise usage of the terminology in the appended claims. Further, while the following examples are presented in relation to certain types of gas turbines or turbine engines, the technology of the present application also may be applicable to other categories of turbine engines, without limitation, as would the understood by a person of ordinary skill in the relevant technological arts. Accordingly, it should be understood that, unless otherwise stated, the usage herein of the term "gas turbine" is intended broadly and with limitation as the applicability of the present invention to the various types of turbine engines.

Given the nature of how gas turbines operate, several terms prove particularly useful in describing certain aspects of their function. These terms and their definitions, unless specifically stated otherwise, are as follows. As will be understood, such terms may be used both in describing or claiming the gas turbine or one of its primary subsystems—i.e., the compressor, combustor, or turbine—as well as to describe or claim components or subcomponents for usage therewithin. In the latter case, the terminology should be understood as describing those components as they would be upon proper installation and/or function within the gas turbine engine or primary subsystem.

Accordingly, the terms "forward" and "aftward" refer to directions relative to the orientation of the gas turbine and, more specifically, the relative positioning of the compressor and turbine sections of the engine. Thus, as used therein, the term "forward" refers to the compressor end while "aftward" refers to the turbine end. It will be appreciated that each of these terms may be used to indicate direction of movement or relative position along the central axis of the engine. As stated above, these terms may be used to describe attributes of the gas turbine or one of its primary subsystems, as well as for components or subcomponents positioned therewithin. Thus, for example, when a component, such as a rotor blade, is described or claimed as having a "forward face", it may be understood as referring to a face oriented in the forward direction as defined by the orientation of the gas turbine (i.e., the positioning of the combustor and turbine subsystems). Unless otherwise stated, this assumption holds for the following descriptive terms as well.

The terms "downstream" and "upstream" are used herein to indicate position within a specified conduit or flowpath relative to the direction of flow (hereinafter "flow direction") moving through it. Thus, the term "downstream" refers to the direction in which a fluid is flowing through the specified conduit, while "upstream" refers to the direction opposite that. These terms may be construed as relating to what would be understood by one skilled in the art as the flow direction through the conduit given normal or anticipated operation. As will be appreciated, within the compressor and turbine sections of the gas turbine, the working fluid is directed downstream and through an annularly shaped working fluid flowpath, which is typically defined about the central and common axis of the gas engine. As such, within the compressor and turbine sections of the engine, the term "flow direction", as used herein, refers to a reference direction representing an idealized or generalized direction of flow of working fluid through the working fluid flowpath of the engine during an expected or normal condition of operation. Thus, within the compressor and turbine sections, the "flow direction" terminology is referring to flow that is parallel to the central axis of the gas turbine and oriented in the downstream or aftward direction.

Accordingly, for example, the flow of working fluid through the working fluid flowpath of the gas turbine may be described as beginning as air pressurized through the compressor per the flow direction, becoming combustion gases in the combustor upon being combusted with a fuel, and, finally, being expanded per the flow direction as it passed through the turbine. Likewise, the flow of working fluid may be described as beginning at a forward or upstream location toward a forward or upstream end of the gas turbine, moving generally in a downstream or aftward direction, and, finally, terminating at an aftward or downstream location toward an aftward or downstream end of the gas turbine.

As many components of gas turbines rotate during operation, such as compressor and turbine rotor blades, the terms rotationally lead and rotationally trail may be used to delineate relative positioning of subcomponents or subregions per the expected rotation within the engine. Thus, as will be appreciated, these terms may differentiate position per the direction of rotation (hereinafter "rotation direction") within the compressor or turbine. As used herein, such rotation direction may be understood as being the expected direction of rotation for a component given normal or anticipated operation of the gas turbine.

In addition, given the configuration of gas turbines, particularly the arrangement of the compressor and turbine sections about a common shaft or rotor, as well as the cylindrical configuration common to many combustor types, terms describing position relative to an axis may be regularly used herein. In this regard, it will be appreciated that the term "radial" refers to movement or position perpendicular to an axis. Related to this, it may be required to describe relative distance from the central axis. In such cases, for example, if a first component resides closer to the central axis than a second component, the first component will be described as being either "radially inward" or "inboard" of the second component. If, on the other hand, the first component resides further from the central axis, the first component will be described as being either "radially outward" or "outboard" of the second component. As used herein, the term "axial" refers to movement or position parallel to an axis, while the term "circumferential" refers to movement or position around an axis. Unless otherwise stated or plainly contextually apparent, these terms should be construed as relating to the central axis of the compressor and/or turbine sections of the gas turbine as defined by the rotor extending through each, even if the terms are describing or claiming attributes of non-integral components—such as rotor or stator blades—that function therein. When otherwise stated, the terms may be used relative to the longitudinal axis of certain components or subsystems within the gas turbine, such as, for example, the longitudinal axis around which conventional cylindrical or "can" combustors are typically arranged.

Finally, the term "rotor blade", without further specificity, is a reference to the rotating blades of either the compressor or the turbine, and so may include both compressor rotor blades and turbine rotor blades. The term "stator blade", without further specificity, is a reference to the stationary blades of either the compressor or the turbine and so may include both compressor stator blades and turbine stator blades. The term "blades" may be used to generally refer to either type of blade. Thus, without further specificity, the term "blades" is inclusive to all type of turbine engine blades, including compressor rotor blades, compressor stator blades, turbine rotor blades, turbine stator blades and the like.

Figure 2:
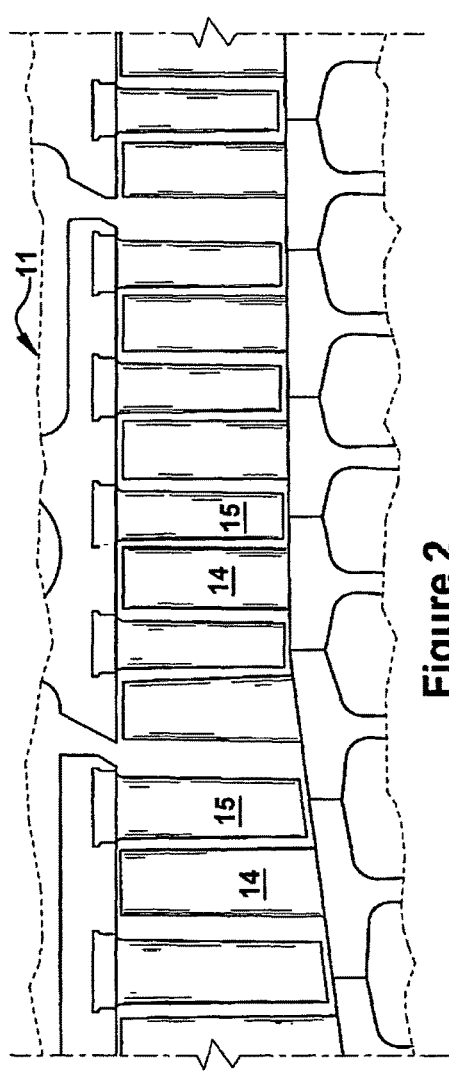
FIG. 2 is a sectional view of the compressor section of the gas turbine of FIG. 1.
Figure 3:
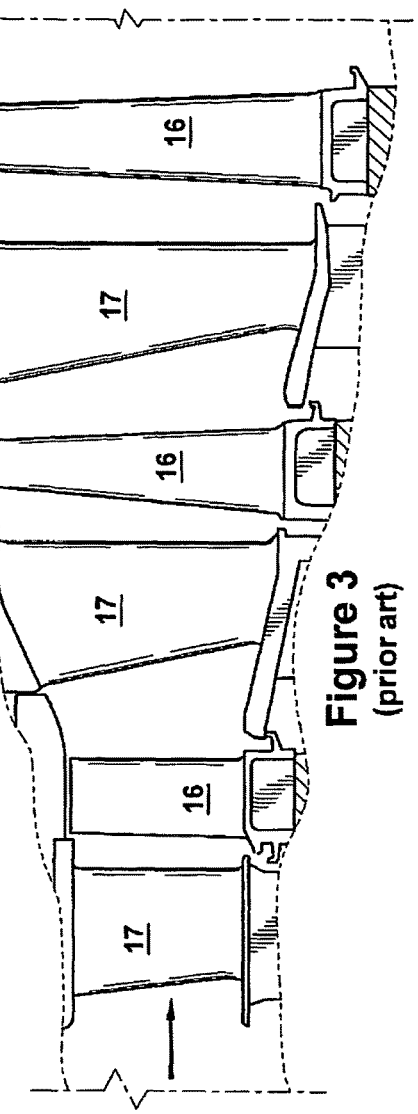
FIG. 3 is a sectional view of the turbine section of the gas turbine of FIG. 1.

By way of background, referring now with specificity to the figures, FIGS. 1 through 3 illustrate an exemplary gas turbine in accordance with the present invention or within which the present invention may be used. It will be understood by those skilled in the art that the present invention may not be limited to this type of usage. As stated, the present invention may be used in gas turbines, such as the engines used in power generation and airplanes, steam turbine engines, as well as other types of rotary engines as would be recognized by one of ordinary skill in the art. The examples provided, thus, are not meant to be limiting unless otherwise stated. FIG. 1 is a schematic representation of a gas turbine 10. In general, gas turbines operate by extracting energy from a pressurized flow of hot gas produced by the combustion of a fuel in a stream of compressed air. As illustrated in FIG. 1, gas turbine 10 may be configured with an axial compressor 11 that is mechanically coupled by a common shaft or rotor to a downstream turbine section or turbine 12, and a combustor 13 positioned between the compressor 11 and the turbine 12. As illustrated in FIG. 1, the gas turbine may be formed about a common central axis 19.

FIG. 2 illustrates a view of an exemplary multi-staged axial compressor 11 that may be used in the gas turbine of FIG. 1. As shown, the compressor 11 may have a plurality of stages, each of which include a row of compressor rotor blades 14 and a row of compressor stator blades 15. Thus, a first stage may include a row of compressor rotor blades 14, which rotate about a central shaft, followed by a row of compressor stator blades 15, which remain stationary during operation. FIG. 3 illustrates a partial view of an exemplary turbine section or turbine 12 that may be used in the gas turbine of FIG. 1. The turbine 12 also may include a plurality of stages. Three exemplary stages are illustrated, but more or less may be present. Each stage may include a plurality of turbine nozzles or stator blades 17, which remain stationary during operation, followed by a plurality of turbine buckets or rotor blades 16, which rotate about the shaft during operation. The turbine stator blades 17 generally are circumferentially spaced one from the other and fixed about the axis of rotation to an outer casing. The turbine rotor blades 16 may be mounted on a turbine wheel or rotor disc (not shown) for rotation about a central axis. It will be appreciated that the turbine stator blades 17 and turbine rotor blades 16 lie in the hot gas path or working fluid flowpath through the turbine 12. The direction of flow of the combustion gases or working fluid within the working fluid flowpath is indicated by the arrow.

In one example of operation for the gas turbine 10, the rotation of compressor rotor blades 14 within the axial compressor 11 may compress a flow of air. In the combustor 13, energy may be released when the compressed air is mixed with a fuel and ignited. The resulting flow of hot gases or working fluid from the combustor 13 is then directed over the turbine rotor blades 16, which induces the rotation of the turbine rotor blades 16 about the shaft. In this way, the energy of the flow of working fluid is transformed into the mechanical energy of the rotating blades and, given the connection between the rotor blades and the shaft, the rotating shaft. The mechanical energy of the shaft may then be used to drive the rotation of the compressor rotor blades 14, such that the necessary supply of compressed air is produced, and also, for example, a generator to produce electricity.

For background purposes, FIGS. 4 through 7 provide views of a turbine rotor blade 16 in accordance with or within which aspects of the present invention may be practiced. As will be appreciated, these figures are provided to illustrate common configurations of rotor blades and delineate spatial relationships between components and regions within such blades for later reference, while also describing geometric constraints and other criteria that affect the internal and external design thereof. While the blade of this example is a rotor blade, it will be appreciated that, unless otherwise stated, the present invention also may be applied to other types of blades within the gas turbine. As stated above, description of such components may include terminology that derives meaning based on the orientation and function of the gas turbine engine and, more specifically, the working fluid flowpath, and, thus, should be understood in that context, i.e., that such description assumes the rotor blade is properly installed and operating under anticipated or normal conditions within the engine.

The rotor blade 16, as illustrated, may include a root 21 that is configured for attaching to a rotor disc. The root 21, for example, may include a dovetail 22 configured for mounting in a corresponding dovetail slot in the perimeter of a rotor disc. The root 21 may further include a shank 23 that extends between the dovetail 22 and a platform 24. The platform 24, as shown, generally forms the junction between the root 21 and an airfoil 25, which is the active component of the rotor blade 16 that intercepts the flow of working fluid through the turbine 12 and induces the desired rotation. The platform 24 may define the inboard end of the airfoil 25. The platform also may define a section of the inboard boundary of the working fluid flowpath through the turbine 12.

The airfoil 25 of the rotor blade may typically include a concave pressure face 26 and a circumferentially or laterally opposite convex suction face 27. The pressure face 26 and suction face 27 may extend axially between opposite leading and trailing edges 28, 29, respectively, and, in the radial direction, between an inboard end, which may be defined at the junction with the platform 24, and an outboard tip 31. The airfoil 25 may include a curved or contoured shape that that is designed for promoting desired aerodynamic performance. As illustrated in FIGS. 4 and 5, the shape of the airfoil 25 may taper gradually as it extends between the platform 24 and the outboard tip 31. The tapering may include an axial tapering that narrows the distance between the leading edge 28 and the trailing edge 29 of the airfoil 25, as illustrated in FIG. 4, as well as a circumferential tapering that reduces the thickness of the airfoil 25 as defined between the suction face 26 and the pressure face 27, as illustrated in FIG. 5. As shown in FIGS. 6 and 7, the contoured shape of the airfoil 25 may further include a twisting about the longitudinal axis of the airfoil 25 as it extends from the platform 24. As will be appreciated, the twisting may be included so to vary a stagger angle for the airfoil 25 gradually between the inboard end and outboard tip 31.

For descriptive purposes, as shown in FIG. 4, the airfoil 25 of the rotor blade 16 may further be described as including a leading edge section or half and trailing edge section or half defined to each side of an axial midline 32. The axial midline 32, according to its usage herein, may be formed by connecting the midpoints 34 of the camber lines 35 of the airfoil 25 between the platform 24 and the outboard tip 31. Additionally, the airfoil 25 may be described as including two radially stacked sections defined inboard and outboard of a radial midline 33 of the airfoil 25. Thus, as used herein, an inboard section or half of the airfoil 25 extends between the platform 24 and the radial midline 33, while an outboard section or half extends between the radial midline 33 and the outboard tip 31. Finally, the airfoil 25 may be described as including a pressure face section or half and a suction face section or half, which, as will be appreciated are defined to each side of the camber line 35 of the airfoil 25 and the corresponding face 26, 27 of the airfoil 25.

The rotor blade 16 may further include an internal cooling configuration 36 having one or more cooling channels 37 through which a coolant is circulated during operation. Such cooling channels 37 may extend radially outward from a connection to a supply source formed through the root 21 of the rotor blade 16. The cooling channels 37 may be linear, curved or a combination thereof, and may include one or more outlet or surface ports through which coolant is exhausted from the rotor blade 16 and into the working fluid flowpath.

Figure 8:
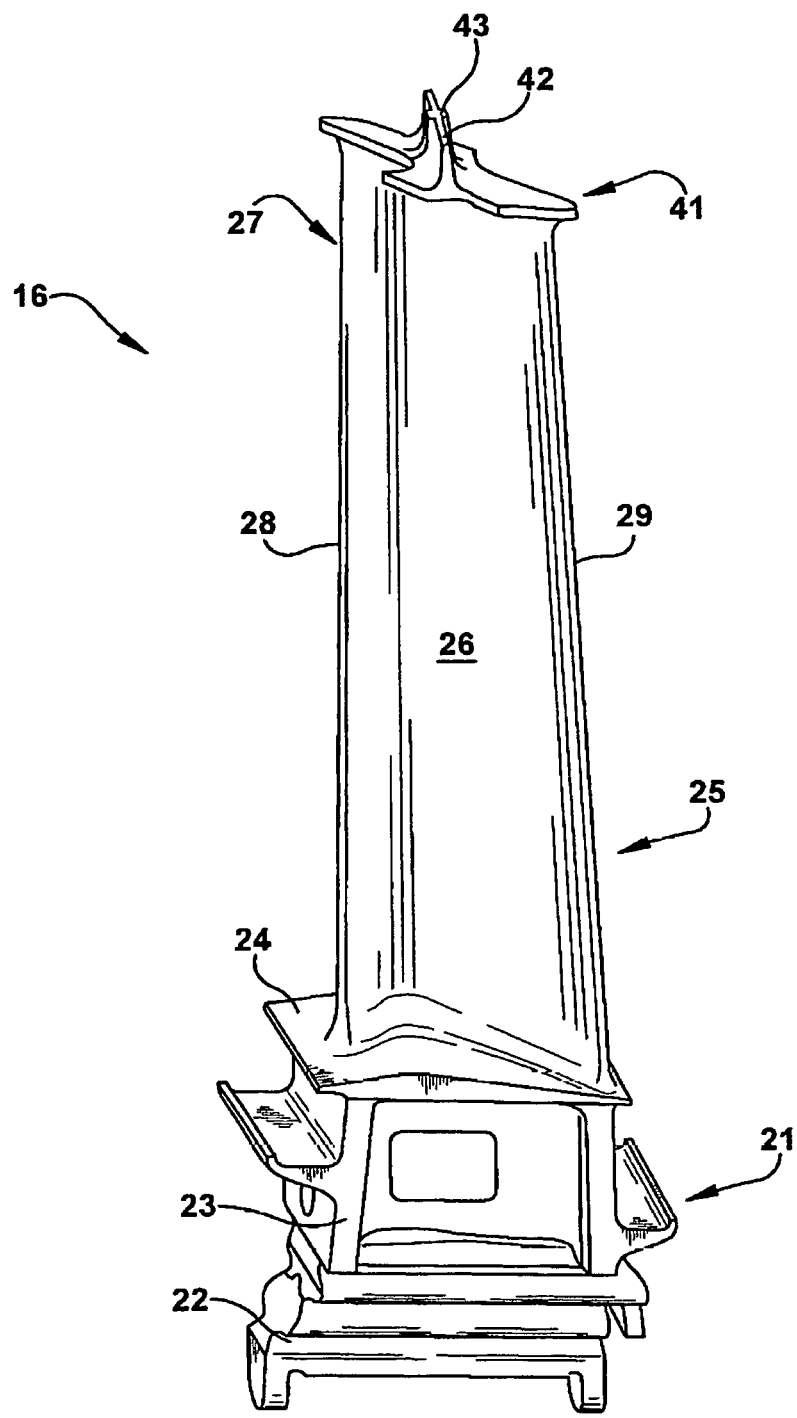
FIG. 8 is a perspective view of an exemplary turbine rotor blade that may include a tip shroud and configuration according to aspects and embodiments of the present application.
Figure 9:
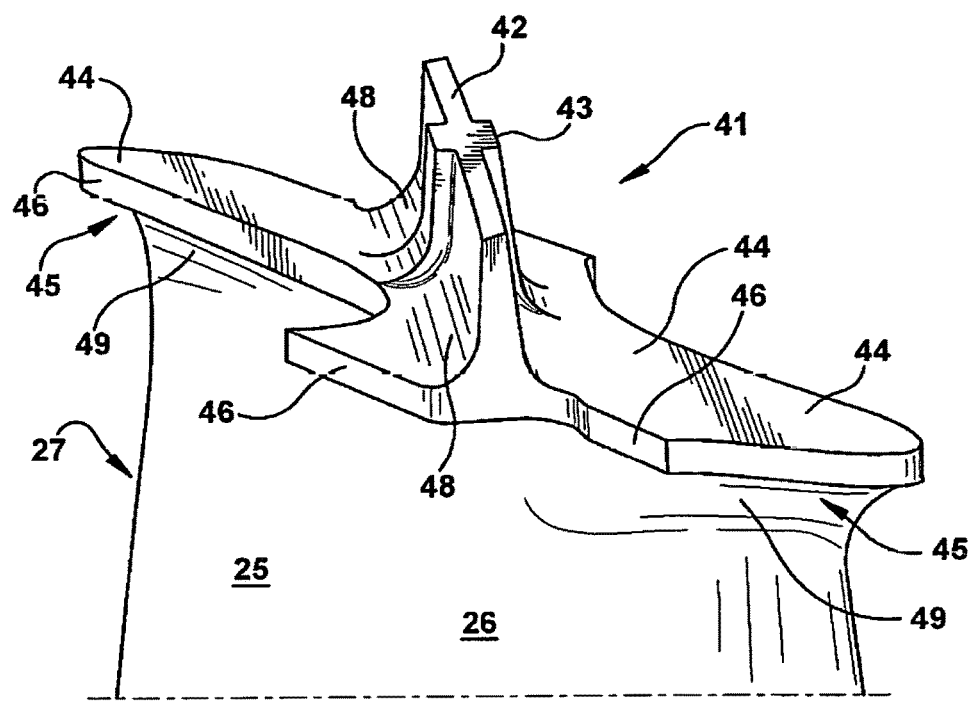
FIG. 9 is an enhanced perspective view of the tip shroud of FIG. 8.
Figure 10:
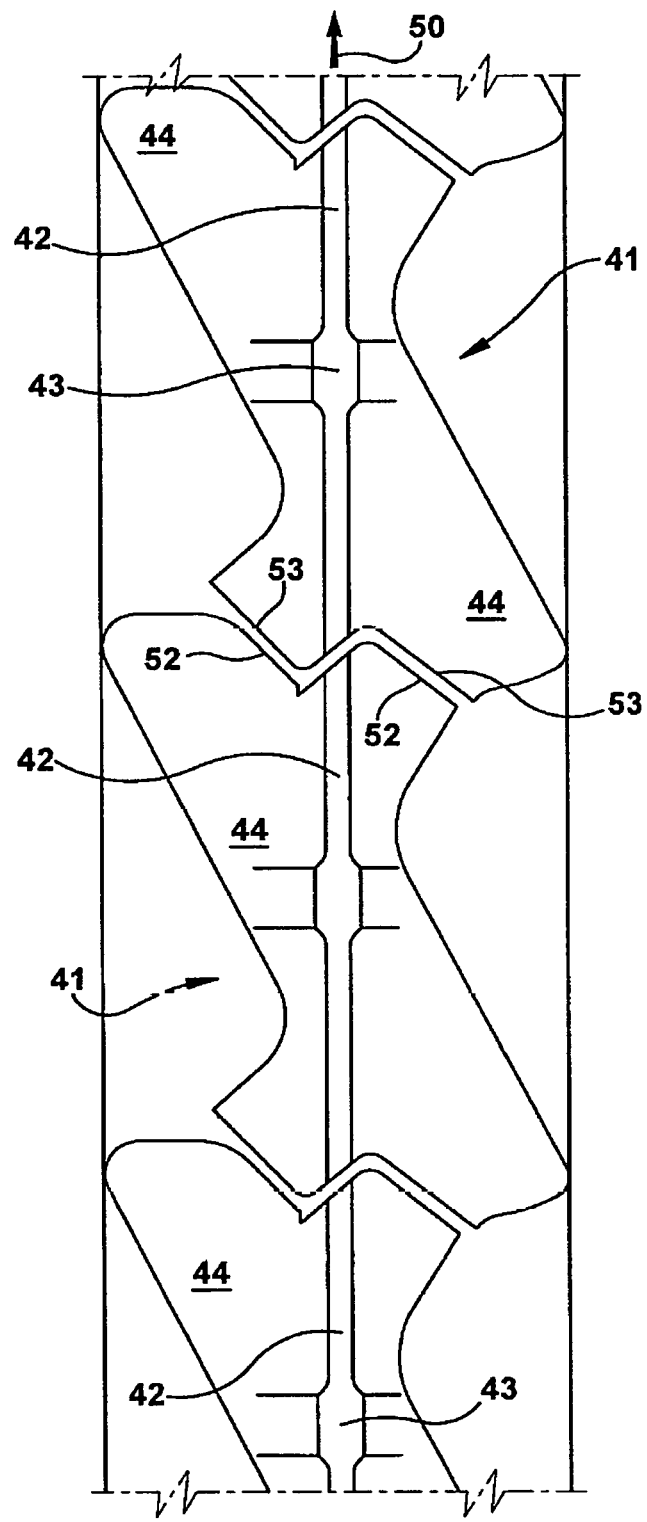
FIG. 10 is an outboard perspective of an installed arrangement of turbine rotor blades that may include tip shrouds and configurations according to aspects and embodiments of the present application.
Figure 11:
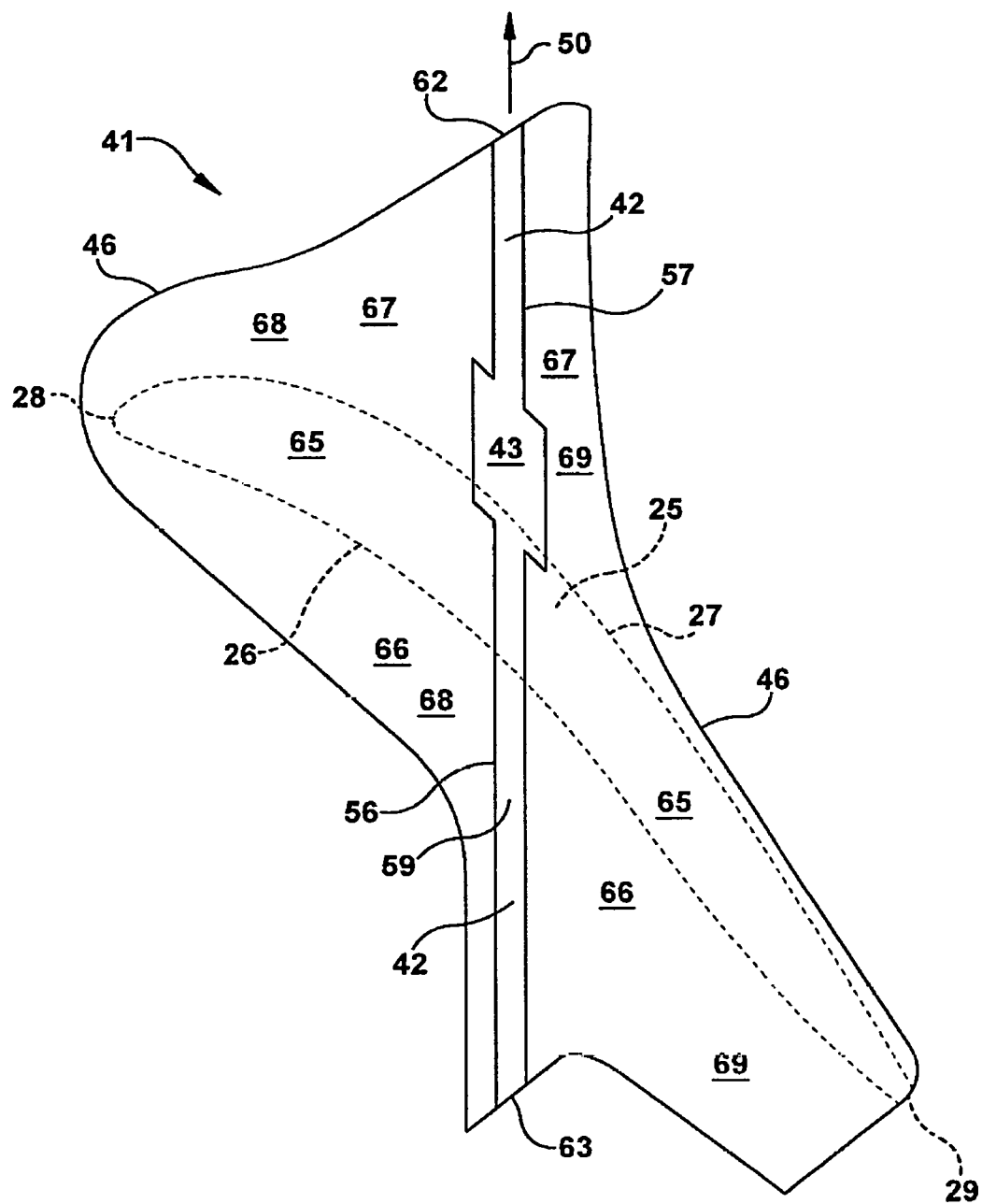
FIG. 11 is an outboard profile of a tip shroud that may include a configuration according to aspects and embodiments of the present application.
Figure 12:
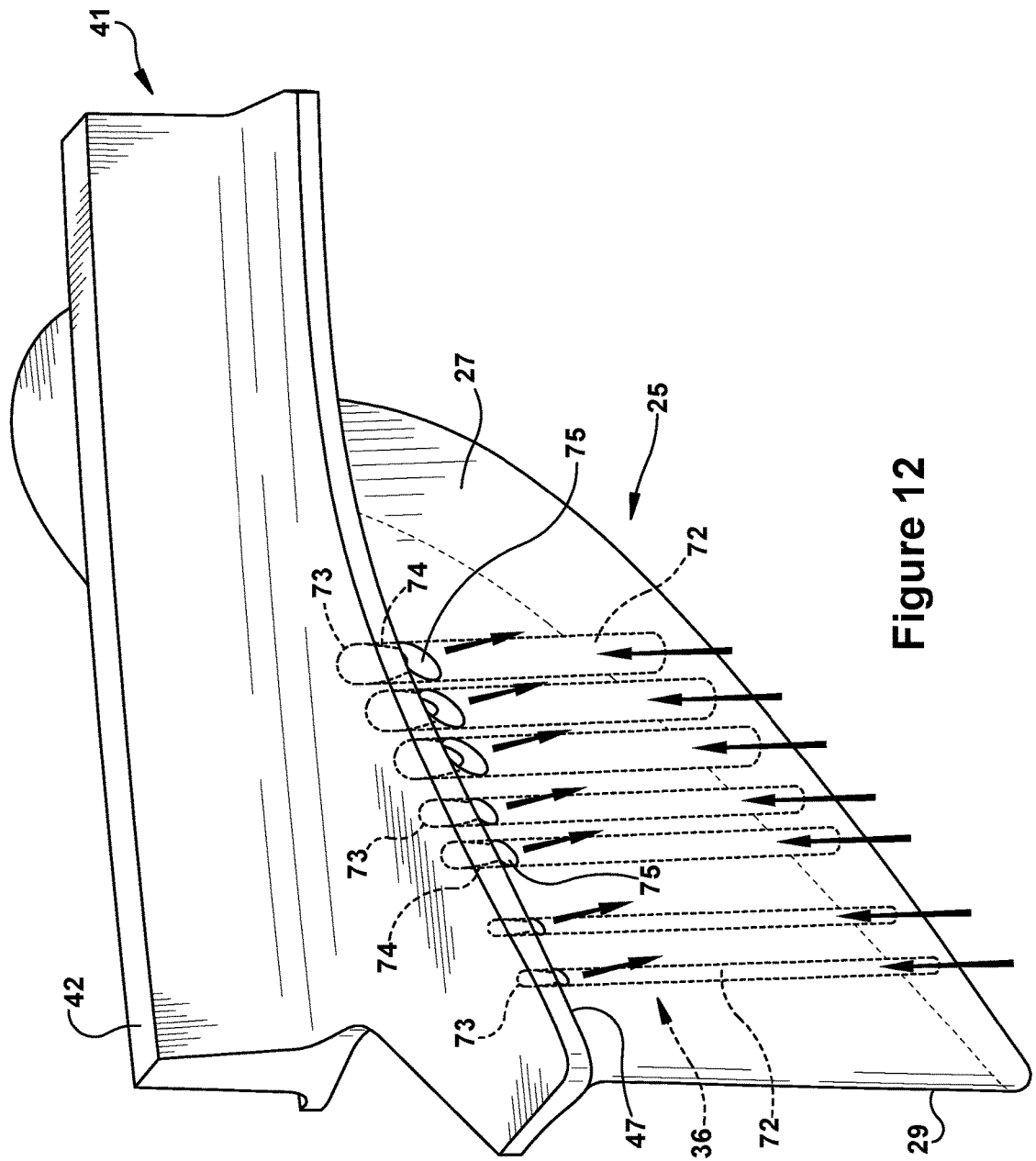
FIG. 12 is a perspective view with partial transparency of a tip shroud and airfoil that includes an internal cooling configuration according to embodiments of the present application.
Figure 13:
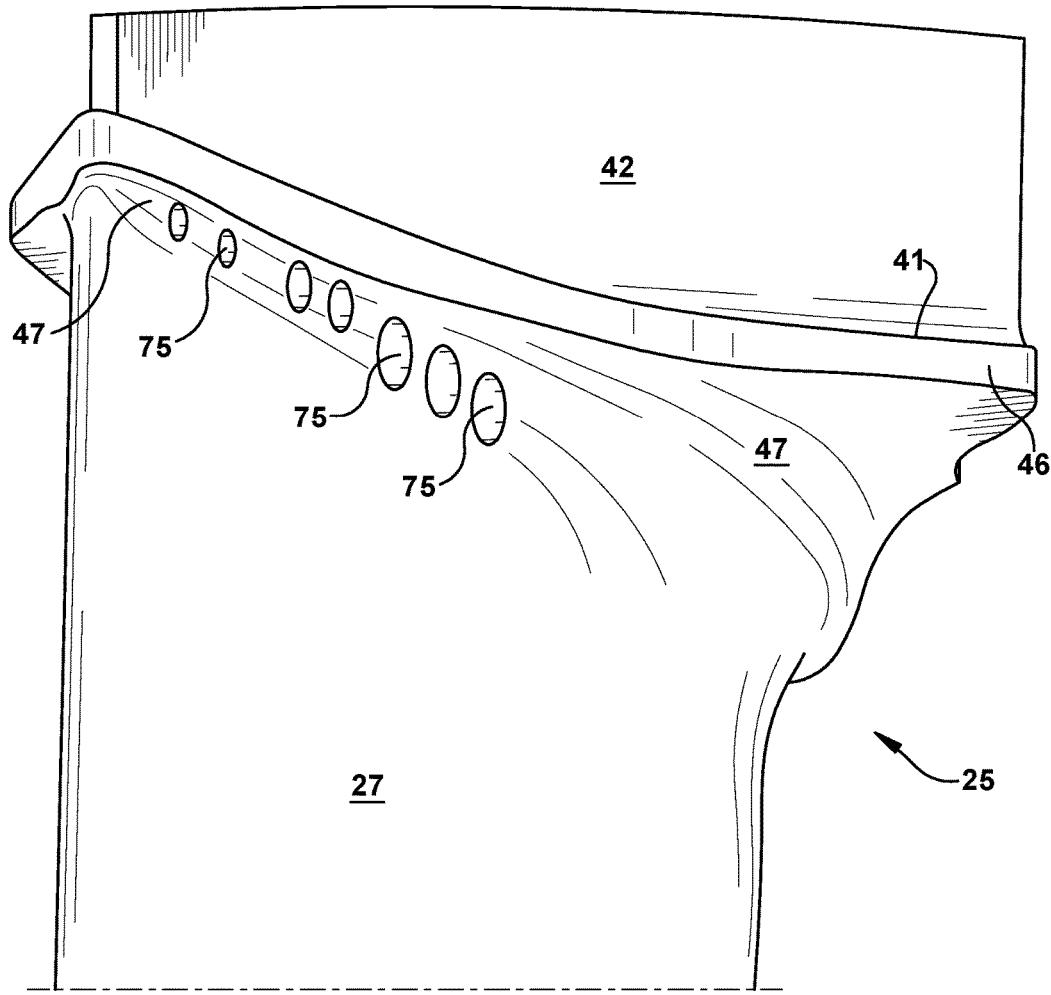
FIG. 13 is a perspective of the outlet ports of the cooling configuration of FIG. 12.

FIGS. 8 through 11 illustrate a turbine rotor blade 16 having a tip shroud 41 in accordance with the present invention or within which the present invention may be used. As will be appreciated, FIG. 8 is a perspective view of an exemplary turbine rotor blade 16 that includes a tip shroud 41, while FIG. 9 is an enhanced view of the tip shroud 41 portion. FIG. 10 provides a profile from an outboard perspective of an exemplary installed arrangement of tip shrouded rotor blades 16. Finally, FIG. 11 provides an enlarged outboard profile view of a tip shroud 41 that may be used to delineate the different regions within tip shrouds in the discussion to follow.

As shown, the tip shroud 41 may be positioned near or at the outboard end of the airfoil 25. The tip shroud 41 may include an axially and circumferentially extending flat plate or planar component, which is supported towards its center by the airfoil 25. For descriptive purposes, the tip shroud 41 may include an inboard surface 45, outboard surface 44, and edge 46. As illustrated, the inboard surface 45 opposes the outboard surface 44 across the narrow radial thickness of the tip shroud 41, while the edge 46 connects the inboard surface 45 to the outboard surface 44 and, as used herein, defines a peripheral or outboard profile of the tip shroud 41.

A seal rail 42 may be positioned along the outboard surface 44 of the tip shroud 41. Generally, as illustrated, the seal rail 42 is a fin-like projection that extends radially outward from the outboard surface 44 of the tip shroud 41. The seal rail 42 may extend circumferentially between opposite ends of the tip shroud 41 in the direction of rotation or "rotation direction" of the rotor blade 16. As will be appreciated, the seal rail 42 may be used to deter leakage of working fluid through the radial gap that typically exists between the tip shroud 41 and the surrounding stationary components, which define the outboard boundary of the working fluid flowpath through the turbine. According to conventional designs, the seal rail 42 may extend radially into an abradable stationary honeycomb shroud that opposes it across that gap. The seal rail 42 may extend across substantially the entire circumferential length of the outboard surface 44 of the tip shroud 41. As used herein, the circumferential length of the tip shroud 41 is the length of the tip shroud 41 in the rotation direction 50. For descriptive purposes, the seal rail 42 may include opposing rail faces, in which a forward face 56 corresponds to the forward direction of the gas turbine, and an aftward face 57 corresponds with the aftward direction. As will be appreciated, the forward face 56 thus faces toward or into the flow direction of working fluid, while the aftward face 57 faces away from it. Each of the forward face 56 and aftward face 57 of the seal rail 42 may be arranged so to form a steep angle relative to the outboard surface 44 of the tip shroud 41.

Though other configurations are possible, the seal rail 42 may have an approximately rectangular profile. The forward face 56 and the aftward face 57 of the seal rail 42 may connect along circumferentially narrow edges, which, as used herein, include: opposing and approximately parallel outboard and inboard edges, and opposing and approximately parallel rotationally leading and rotationally trailing edges. Specifically, the inboard edge of the seal rail 42 may be defined at the interface between the seal rail 42 and the outboard surface 44 of the tip shroud 41. As will be appreciated, the inboard edge is somewhat obscured given the fillet regions that are formed for structural purposes between the seal rail 42 and the tip shroud 41, and thus is not specifically referenced by a numeral identifier. The outboard edge 59 of the seal rail 42 is radially offset from the outboard surface 44 of the tip shroud 41. This radial offset, as will be appreciated, generally represents the radial height of the seal rail 42. As indicated, a rotationally leading edge 62 of the seal rail 42 juts radially from the edge 46 of the tip shroud 41 that overhangs the suction face 27 of the airfoil 25. Because of this, the rotationally leading edge 62 is the component that "leads" the seal rail 42 as the rotor blade 16 rotates during operation. At the opposite end of the seal rail 42, a rotationally trailing edge 63 juts radially from the edge 46 of the tip shroud 41 that overhangs the pressure face 26 of the airfoil 25. Given this arrangement, the rotationally trailing edge 63 is the component that "trails" the seal rail 42 as the rotor blade 16 rotates during operation.

A cutter tooth 43 may be disposed on the seal rail 42. As will be appreciated, the cutter tooth 43 may be provided for cutting a groove in the abradable coating or honeycomb of the stationary shroud that is slightly wider than the width of the seal rail 42. As will be appreciated, the honeycomb may be provided to enhance seal stability, and the use of the cutter tooth 43 may reduce spillover and rubbing between stationary and rotating parts by clearing this wider path. The cutter tooth 43 generally is an area of increased width along the circumferential length of the seal rail 42. More particularly, the cutter tooth 43 may include a circumferential section of the seal rail 42 that is axially widened. This axial widened region may extend radially between the outboard surface 44 of the tip shroud 41 and the outboard edge of the seal rail 42. The cutter tooth 43 may be positioned near the center or middle region of the seal rail 42. As provided below, the cutter tooth 43 may be disposed within the airfoil portion of the outboard surface 44 of the tip shroud 41. The cutter tooth 43 may have an approximate rectangular profile, though other profiles are also possible.

The tip shroud 41 may include fillet regions 48, 49 that are configured to provide smooth surficial transitions between the divergent surfaces of the tip shroud 41 and the airfoil 25, as well as those between the tip shroud 41 and the seal rail 42. As such, configurations of the tip shroud 41 may include an outboard fillet region 48 that is formed between the outboard surface 44 of the tip shroud 41 and the forward face 56 and aftward face 57 of the seal rail 42. The tip shroud 41 may further include an inboard fillet region 49 that is formed between the inboard surface 45 of the tip shroud 41 and the pressure and suction faces 26, 27 of the airfoil 25. As will be appreciated, the inboard fillet region 49 may be more particularly described as including: a pressure inboard fillet region, which is the portion formed between the pressure face 26 of the airfoil 25 and the inboard surface 45 of the tip shroud 41; and a suction inboard fillet region, which is the portion formed between the suction face 26 of the airfoil 25 and the inboard surface 45 of the tip shroud 41. The outboard fillet region 48 may be more particularly described as including: a forward outboard fillet region, which is the portion formed between the forward face 56 of the seal rail 42 and the outboard surface 44 of the tip shroud 41; and an aftward outboard fillet region, which is the portion formed between the aftward face 57 of the seal rail 42 and the outboard surface 44 of the tip shroud 41. As depicted, each of these fillet regions 49, 48 may be configured to provide smoothly curving transitions between the several planar surfaces that form abrupt or steeply angle transitions. As will be appreciated, such fillet regions may improve aerodynamic performance as well as spread stress concentrations that would otherwise occur in those areas. Even so, these areas remain highly stressed due to the overhanging or cantilevered load of the tip shroud 41 and the rotational speed of the engine. As will be appreciated, without adequate cooling, the stresses in these areas are a significant limit on the useful life of the component.

With particular reference now to FIG. 10, tip shrouds 41 may be configured to include a contact interface in which contact surfaces or edges engage like surfaces or edges formed on the tip shrouds 41 of neighboring rotor blades during operation. As will be appreciated, this may be done, for example, to reduce leakage or harmful vibration. FIG. 10 provides an outboard view of tip shrouds 41 on turbine rotor blades as they might appear in an assembled condition. As indicated, relative to the rotation direction 50, the edge 46 of the tip shroud 41, for descriptive purposes, may include a rotationally leading contact edge 52 and a rotationally trailing contact edge 53. Thus, as shown, the tip shroud 41 in a rotationally leading position may be configured with a rotationally trailing contact edge 53 that contacts or comes in close proximity to the rotationally leading contact edge 52 of the tip shroud 41 in a rotationally trailing position relative to it. While this area of contact between the neighboring tips shrouds 41 may be generally referred to as a contact interface, given the profile of the exemplary configuration, it also may be referred to as a "Z-notch" interface. Other configurations are also possible. In forming the contact interface, the edge 46 of the tip shroud 41 may be configured with a notched section that is intended to cooperatively contact or engage a neighboring and samely-configured tip shroud 41 in a predetermined manner.

With particular reference now to FIG. 11, the outboard profile of the tip shroud 41 may have a scallop shape. Though other configurations are possible, the exemplary scallop shape is one that performs well in terms of reducing leakage while also minimizing weight. Whatever the profile, it will be appreciated that the regions or portions that make up the tip shroud 41 may be described given their position relative to the seal rail 42 and/or the profile of the underlying airfoil 25. Thus, as used herein, an airfoil portion 65 of the tip shroud 41 is the portion defined within a profile of the airfoil 25 projected radially through the tip shroud 41. A pressure portion 66 of the tip shroud 41 is the portion that cantilevers from and overhangs the pressure face 26 of the airfoil 25, while a suction portion 67 of the tip shroud 41 is the portion that cantilevers from and overhangs the suction face 27 of the airfoil 25. Finally, a leading portion 68 of the tip shroud 41 is the portion that extends in a forward direction from the seal rail 42 so to overhang the leading edge 28 of the airfoil 25, while a trailing portion 69 of the tip shroud 41 is the portion that extends in an aftward direction from the seal rail 42 so to overhang the trailing edge 29 of the airfoil 25.

With reference now to FIGS. 12 through 15, several internal cooling configurations are presented in accordance with aspects and exemplary embodiments of the present invention. As will be appreciated, these examples are described with reference to and in light of the systems, components, and related concepts already provided herein, particularly those discussed in relation to the preceding figures.

As illustrated, the present invention may include interior cooling configurations for gas turbine rotor blades. As will be seen, such cooling configurations may include one or more internal cooling channels for receiving and directing a coolant, such as compressed air bled from the compressor, through the interior of the rotor blades. According to present configurations, an interior cooling configuration 36 is provided having one or more of the cooling channels formed within the rotor blade, each of which may include fluidly connected and sequential sections or segments that extend through the root, airfoil, and/or portions of the tip shroud. As provided below, and with reference to the several figures, these segments may include a supply segment 72, an elbow segment 73, and an outlet segment 74.

As illustrated, the supply segment 72 may form the upstream end of the cooling channel and, thus, may extend through the root 21 of the rotor blade 16 so to connect the cooling configuration 36 to a coolant source. The cooling configuration 36 may include several of the cooling channels, and each of these may include a discrete and separate supply segment 72 that extends radially outward through the airfoil 25. According to exemplary configurations, as illustrated in FIGS. 12 through 15, each of the supply segments 72 may be configured as a radially oriented coolant passageway formed through the interior of the airfoil 25. The supply segments 72 may be linear, though other configurations are also possible. At a downstream end, each of the supply segments 72 may fluidly connect to one of the elbow segments 73.

The elbow segment 73, according to present configurations, is the section of the cooling channel through which an abrupt change of direction is effectuated. The elbow segment 73, as illustrated, may connect the supply segment 72 to the outlet segment 74 while accommodating the change of direction that occurs therebetween. As illustrated, this change of direction may be an abrupt or sharp one. According to exemplary embodiments, the change of direction occurring through the elbow segment 73 may include an angle of approximately 90 degrees. More generally, according to other embodiments, the change of direction through the elbow segment 73 may include an angle within a range of values. For example, the elbow segment 73 may include a change of direction of between 60 and 120 degrees. According to other embodiments, the elbow segment 73 is configured to effectuate a change of direction of between 80 and 100 degrees. In making this change of direction, the elbow segment 73 may be configured so that the curvature is sharp instead of gradual. As will be appreciated, the sharp curvature of the elbow segment 73 may be describe via relating the radius of curvature through the length of the elbow segment 73 to the diameter of the cross-sectional flow area of the elbow segment 73. According to preferred embodiments, the radius of curvature is at least greater than twice the diameter of the cross-sectional flow area.

As will be discussed, the elbow segment 73 may be configured to occur within a target interior region of the rotor blade 16. This target interior region may be one that is meant to be convectively cooled via the coolant moving through the elbow segment 73. As will be appreciated, the change of direction through the elbow segment 73 may induce turbulent flow in coolant flow which may increase its effectiveness. According to certain preferred embodiments, the target interior region within which the elbow segment 72 is located comprises either the internal region of the airfoil 25 that is near the tip shroud 41 or the inboard fillet region 49 between the airfoil 25 and the tip shroud 41. According to other preferred embodiments, the target interior region is the suction face inboard fillet region 49. In certain preferred embodiments, the target interior region is limited to the aft half of the airfoil 25. More preferable still, the target interior region comprises the aft half of the suction face inboard fillet region 49.

The outlet segment 74, as illustrated in FIGS. 12 through 15, is the portion of the cooling channel that extends between the elbow segment 73 and an outlet port 75 formed on the outer surface of the rotor blade 16. Thus, the outlet segment 74 is the section through which the coolant flowing within the cooling channels is exhausted to the working fluid flowpath. The outlet segment 74 may include an upstream end, which connects to the elbow segment 73, and a downstream end, which is configured as the outlet port 75. As illustrated, between the elbow segment 73 and the outlet port 75, the outlet segment 74 may extend along a linear path, though other configurations are also possible. Within any one of the cooling channels, the cross-sectional flow area of the outlet segment 74 and the elbow segment 73, as well as the supply segment 72, may be approximately the same, though other configurations are also possible. As will be appreciated, since the outlet port 75 is formed on an outer surface of the rotor blade 16, the outlet segment 74 allows the cooling channel of the present invention to fluidly communicate with the working fluid flowpath through the turbine 12.

According to preferred embodiments, the outlet ports 75 of the outlet segments 74 may be formed on predetermined target surface areas. These target surface areas, in general, may include any of the several surface areas of the airfoil 25 and/or tip shroud 41 that have already been discussed herein. In accordance with exemplary embodiments, thus, the target surface areas for the cooling configuration 36 may include one or more of the following: the pressure face 26 of the airfoil 25; the suction face 27 of the airfoil 25; the surface area corresponding to the inboard fillet region 49; the surface area corresponding to the outboard fillet region 48; the inboard surface 45 of the tip shroud 41; and the edge 46 of the tip shroud 41. According to preferred embodiments, the outlet ports 75 are formed just inboard of the tip shroud 41 and on the suction face 27 of the airfoil 25. As illustrated, the preferred location may further include the outer surface region of the inboard fillet region 49 and/or the outboard region of the suction face 27 of the airfoil 25 (i.e., the region of the suction face 27 of the airfoil 25 near the tip shroud 41). As shown, according to preferred embodiments, the outlet ports 75 may be arrayed in a row along the aft portion of the inboard fillet region 49 of the suction face 27 of the airfoil 25. The row of outlet ports 75 may be formed just inboard and approximately parallel to the tip shroud 41.

According to other preferred embodiments, the elbow segment 73 may be formed so to bisect or extend through preselected target interior regions. These target interior regions may include the outboard region of the airfoil 25 near or abutting the tip shroud 41 and the inboard fillet region 49. That is to say, according to preferred embodiments, the elbow segment 73 is formed just inboard of the tip shroud 41. As will be appreciated, positioned in this location, the target interior regions may include the suction inboard fillet region 49 and/or the outboard internal region of the suction face 27 of the airfoil 25.

The cooling configurations 36 of the present invention may include multiple ones of the cooling channels extending through the rotor blade 16. These may be centered within the airfoil 25 or may be offset toward the suction face 27 of the airfoil 25. The cooling channels also may be grouped in the aft axial half of the airfoil 25, which, as used herein, is aft of the axial midline 32 of the airfoil 25. According to preferred embodiments, there may be a plurality of the supply segments 72 and these, as illustrated, may extend approximately parallel relative to each other in a radial direction through the airfoil 25. As shown, these supply segments 72 may be positioned within the aft half of the airfoil 25. According to a preferred embodiment, the supply segments 72 may be regularly space along the camber line 35 of the airfoil 25. Further, the cross-sectional flow areas of the supply segments 72, as well as that of the connecting elbow and outlet segments 73, 74, may decrease as the cooling channels are positioned nearer to the trailing edge 29 of the airfoil 25. As will be appreciated, this narrowing among the cooling channels may proportionally coincide with the narrowing of the airfoil 25 as it extends toward the trailing edge 29.

As stated, the supply segments 72 of each of the cooling channels may extend radially to a position in the airfoil 25 that is near or in close proximity to the tip shroud 41 or the outer radial end of the airfoil 25. Each of the supply segments 72 may connect with a corresponding one of the elbow segments 73, which, as stated, bend the flow direction through the cooling channel by approximately 90 degrees. As illustrated, the elbow segments 73 may be configured to turn the cooling channel so that the flow direction through the outlet segments 74 aligns approximately with the flow direction of the working fluid through the turbine 12. As will be appreciated, the flow direction through the turbine 12 is generally perpendicular relative to the long axis of the seal rail 42 and, directionally, so that the pressure face 26 is the upstream face of the airfoil 25. From the elbow segment 73, each cooling channel may include an outlet segment 74 that connects it to one of the outlet ports 75. According to preferred embodiments, the outlet port 75 may be formed on the suction face 27 of the airfoil 25 or the suction face inboard fillet region 49 between the airfoil 25 and the tip shroud 41. As illustrated most clearly on FIG. 13, the cooling configuration 36 may include the outlet ports 75 being arranged as a row spaced along the aft half of the suction face 27.

The outlet ports 75, as stated, may serve to discharge coolant flowing through each of the cooling channels. Pursuant to conventional design, radial oriented cooling channels are typically configured to continue through the tip shroud so to connect to outlet ports that are positioned on the outboard surface of the tip shroud. With this arrangement, the coolant discharged from the outlet ports is discharged in a direction that is substantially perpendicular to the direction of flow through the turbine. As will be appreciated, the release of coolant in this manner causes significant aerodynamic mixing losses. That is to say, the discharged coolant generally disturbs and impedes the flow of working fluid through the flowpath of the turbine, which negatively impacts aerodynamic performance and, ultimately, the efficiency of the engine.

According to configurations of the present invention, as described, the included elbow segments 73 bend or turn each of the cooling channels so that the coolant being discharged therefrom is released at a shallow or small angle relative to the flow direction of working fluid through the turbine 12 or, in accordance with certain preferred embodiments, parallel thereto. That is to say, the elbow segment 73, according to preferred embodiments, may be configured such that the outlet segment 74 extending from it does so in a direction that aligns closely with or within a preferred angular range of the direction of flow through the turbine 12.

Figure 14:
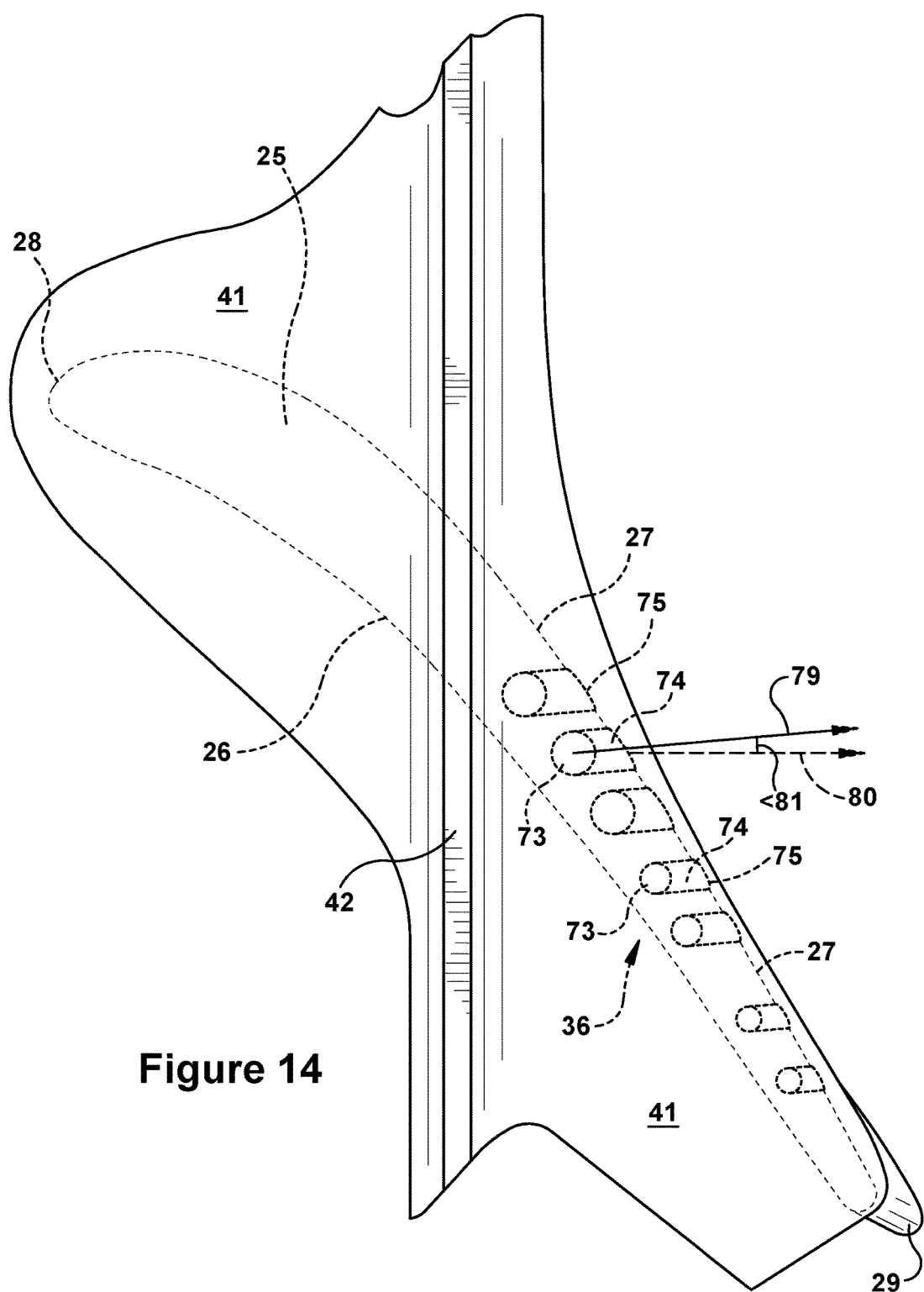
FIG. 14 is an outboard perspective with partial transparency of a tip shroud and airfoil that includes an internal cooling configuration according to aspects and embodiments of the present application.
Figure 15:
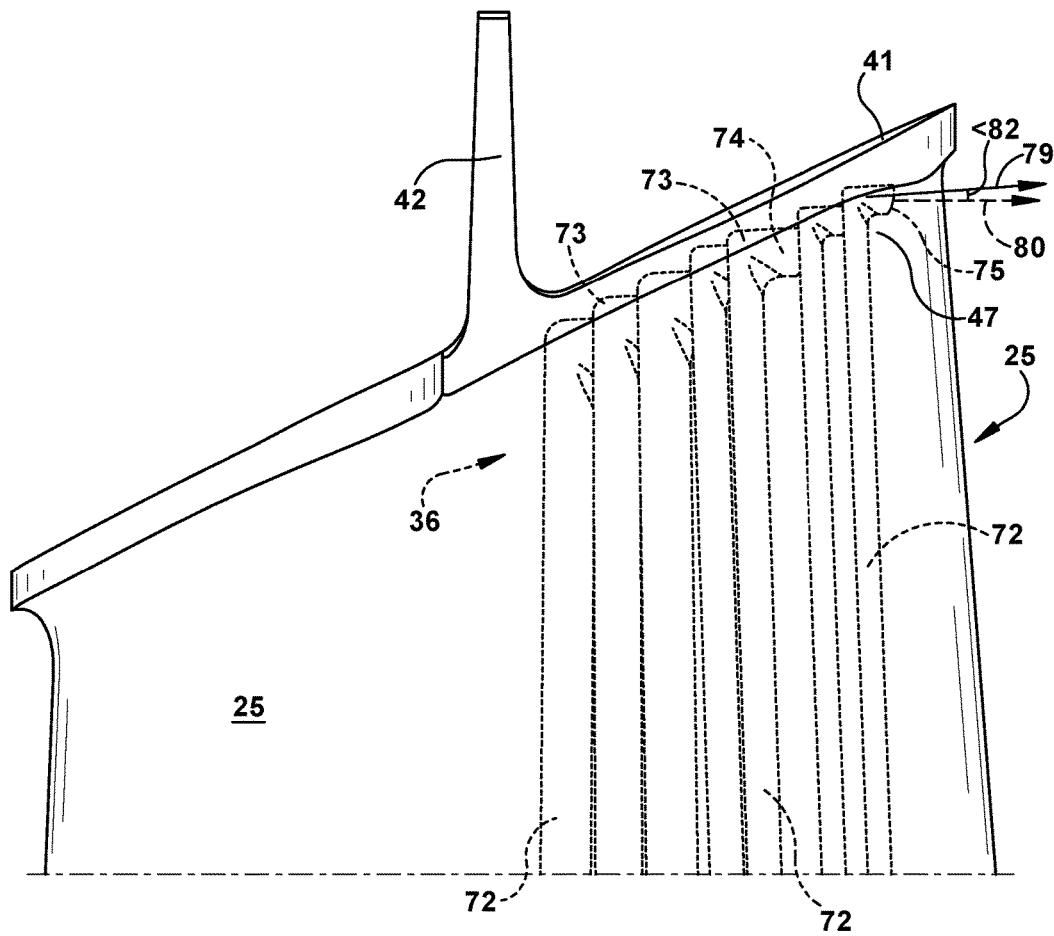
FIG. 15 is a side view with partial transparency of a tip shroud and airfoil that includes an internal cooling configuration according to embodiments of the present application.

To more particularly describe this angular relationship, it may be useful to introduce several terms (including "discharge direction," "axial reference line," and "discharge angle") and define how these will be used herein. As indicated in FIGS. 14 and 15, the discharge direction 79 represents the direction in which the outlet segment 74 is aimed for discharging cooling exiting therefrom. The discharge direction 79, thus, is the direction that fluid being expelled from the outlet segment 74 would travel if not otherwise acted upon. The discharge direction 79 may be further understood as being approximated by a continuation of a reference line where that reference line is defined by the central longitudinal axis of the outlet segment 74. The axial reference line 80, as used herein, is a reference line that is aligned pursuant to and in the general direction of the flow of working fluid through the turbine 13. The axial reference line 80, thus, may be assumed to be one that is substantially parallel to the central axis 19 through the turbine 12 and directed in the downstream direction. Finally, the discharge angle 81, 82, as used herein, is the reference angle formed between the discharge direction 79 of one of the output segments 74 and the axial reference line 80. As will be appreciated, the discharge angle 81, 82 may be defined both tangentially and radially. That is to say, the discharge angle 81, 82 may describe the degree to which the discharge direction 79 is canted tangentially or radially with respect to the axial reference line 80. Thus, as indicated in FIG. 14, a tangential discharge angle 81 reflects a tangential cant or angle between the discharge direction 79 and the axial reference line 80, while, as shown in FIG. 15, a radial discharge angle 82 reflects a radial cant or angle occurring between the discharge direction 79 and the axial reference line 80.

The present cooling configurations 36, as stated, may be configured such that the discharge angle 81, 82 is relatively shallow. As will be appreciated, the particular size of the discharge angle 81, 82 may be varied, as the optimal angular value or range may be dependent on several factors, such as the configuration of the tip shroud or airfoil, or upon other design criteria, such as rotor blade cooling requirements and strategy. Additionally, while the cooling performance of the present configurations may be optimized or enhanced at specific values or within certain preferred ranges, it should be understood that performance benefits may be achieved across a wide spectrum of values for the discharge angle 81, 82. With that stated, applicants have determined several preferred embodiments that are particularly advantageous when used in conjunction with common rotor blade configurations, and these embodiments will now be disclosed. In regard to the tangential discharge angle 81—as depicted in FIG. 14—exemplary configurations of the outlet segments 74 include a tangential discharge angle 81 that is within a range of between about +/−30 degrees relative to the axial reference line 80. According to certain preferred embodiments, the outlet segments 74 are formed such that the tangential discharge angle 81 is within a range of about +/−10 degrees relative to the axial reference line 80. Still other preferred embodiments include outlet segments 74 that have a tangential discharge angle 81 that approach 0 degrees, i.e., the discharge direction 79 is approximately parallel to the axial reference line 80. In regard to the radial discharge angle 82—as depicted in FIG. 15—exemplary configurations of the outlet segments 74 include a radial discharge angle 82 that is within a range of between about +/−30 degrees relative to the axial reference line 80. According to certain preferred embodiments, the outlet segments 74 are formed such that the radial discharge angle 82 is within a range of about +/−10 degrees relative to the axial reference line 80. Still other preferred embodiments include outlet segments 74 having a radial discharge angles 82 that approach 0 degrees, i.e., the discharge direction 79 is approximately parallel to the axial reference line 80.

As will be appreciated, the discharging of coolant at such shallow angles relative to the downstream axial direction, as described herein, may reduce aerodynamic mixing losses. This results from the fact that flow disruption to the working fluid is minimized. Further, the release of coolant in the manners described herein may reduce the strength of secondary vortexes by more smoothly mixing the discharged coolant with the flow of working fluid. This may improve overall efficiency and performance. Additionally, the discharge angle 81, 82 and the proposed location of the cooling channels and the outlet ports 75 related thereto (i.e., through and on airfoil regions related to the aft portions of the suction face 27 and near the tip shroud 41 and the suction face inboard fillet region 49) may address cooling requirements in a region that is difficult to cool while also improving or reducing overall torsional forces acting on this region of the airfoil 25.

As one of ordinary skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, all of the possible iterations is not provided or discussed in detail, though all combinations and possible embodiments embraced by the several claims below or otherwise are intended to be part of the present application. In addition, from the above description of several exemplary embodiments of the invention, those skilled in the art will perceive improvements, changes and modifications. Such improvements, changes and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

That which is claimed:

1. A rotor blade for use in a turbine of a gas turbine that includes:
   an airfoil defined between a concave pressure face and a laterally opposed convex suction face, wherein the pressure face and the suction face extend axially between opposite leading and trailing edges and radially between an outboard tip and an inboard end that attaches to a root configured to couple the rotor blade to a rotor disc;
   a cooling configuration that includes multiple cooling channels for receiving and directing a coolant through an interior of the rotor blade, the cooling channels each including fluidly connected sequential segments in which:
      a supply segment extends radially through the airfoil;
      an outlet segment discharges the coolant from the rotor blade at a shallow angle relative to a flow direction of a main working fluid through the turbine; and
      an elbow segment connects the supply segment to the outlet segment, the elbow segment configured for accommodating a change of direction between the supply segment and the outlet segment.

2. The rotor blade according to claim 1, wherein a tip shroud is connected to the outboard tip of the airfoil, the tip shroud comprising an axially and circumferentially extending substantially planar component supported by the outboard tip of the airfoil;
   wherein the outlet segment extends between an upstream end, which connects to the elbow segment, and a downstream end, at which an outlet port is formed on an outer surface of the rotor blade;
   wherein the outlet port of each of the cooling channels comprises a location that is inboard of the tip shroud; and
   wherein an aft half of the airfoil is defined as an airfoil portion that is aft of an axial middle of the airfoil.

3. The rotor blade according to claim 2, wherein:
   the outlet port of each of the cooling channels is formed through a target surface area of the rotor blade; and
   the elbow segment of each of the cooling channels is located so to pass through a target interior region of the rotor blade;
   further comprising an inboard fillet region configured to smoothly transition between a surface of the airfoil and an inboard surface of the tip shroud, the inboard fillet region comprising a pressure face inboard fillet region and a suction face inboard fillet region that correspond, respectively, to the pressure face and suction face of the airfoil.

4. The rotor blade according to claim 3, wherein the target surface area comprises the suction face of the airfoil near adjacent to the outboard tip of the airfoil; and
   wherein the target interior region comprises an internal region of the airfoil adjacent to the suction face of the airfoil.

5. The rotor blade according to claim 3, wherein the target surface area comprises an aft half of the suction face of the airfoil adjacent to the outboard tip of the airfoil; and
   wherein the target interior region comprises an internal region of the airfoil on the aft half of the suction face of the airfoil.

6. The rotor blade according to claim 3, wherein the target surface area comprises a surface area corresponding to the suction face inboard fillet region; and wherein the target interior region comprises the suction face inboard fillet region.

7. The rotor blade according to claim 3, wherein the target surface area comprises an aft half of a surface area corresponding to the suction face inboard fillet region; and
   wherein the target interior region comprises an aft half of the suction face inboard fillet region.

8. The rotor blade according to claim 3, wherein the target surface area comprises at least one of: an aft half of the suction face of the airfoil adjacent to the outboard tip of the airfoil; and an aft half of a surface area corresponding to the suction face inboard fillet region; and wherein the target interior region comprises at least one of: an internal region of the airfoil on the aft half of the suction face of the airfoil adjacent to the outboard tip of the airfoil; and an aft half of the suction face inboard fillet region.

9. The rotor blade according to claim 8, wherein the supply segment of each of the cooling channels comprises an upstream end formed through the root of the rotor blade, at which the supply segment fluidly connects to a coolant source, and a downstream end that fluidly connects to the elbow section; and wherein the supply segment comprises a radially oriented linear passageway formed through the airfoil.

10. The rotor blade according to claim 9, wherein, relative to an expected flow direction of the coolant within each of the cooling channels, the supply segment is upstream relative to the elbow segment, and the elbow segment is upstream relative to the outlet segment.

11. The rotor blade according to claim 8, wherein, the change of direction through the elbow segment comprises between 60 and 120 degrees.

12. The rotor blade according to claim 8, wherein the change of direction through the elbow segment comprises between 80 and 100 degrees.

13. The rotor blade according to claim 8, wherein the change of direction through the elbow segment comprises 90 degrees.

14. The rotor blade according to claim 12, wherein a radius of curvature along a length of the elbow section is at least greater than twice a diameter of a cross-sectional flow area through the elbow section.

15. The rotor blade according to claim 14, wherein the supply segments of the cooling channels extend approximately parallel relative to each other in a radial direction through the airfoil and are grouped within the aft half of the airfoil; and wherein the outlet ports comprise a row formed along at least one of: the aft half of the suction face of the airfoil adjacent to the outboard tip of the airfoil; and the aft half of the surface area corresponding to the suction face inboard fillet region.

16. The rotor blade according to claim 15, wherein the supply segments of the cooling channels are regularly space along the camber line of the airfoil; and wherein the row of the outlet ports is approximately parallel to the tip shroud.

17. The rotor blade according to claim 14, wherein:

a discharge direction for each comprises a direction in which a fluid being expelled therefrom travels;

an axial reference line comprises a reference line that is parallel to a central axis of the turbine and aimed toward the flow direction of the main working fluid through the turbine;

a discharge angle is the reference angle formed between the discharge direction of each of the output segments and the axial reference line, the discharge angle comprising a tangential discharge angle, which indicates a tangential cant between the discharge direction and the axial reference line, and a radial discharge angle, which indicates a radial cant between the discharge direction and the axial reference line; and wherein, for each of the outlet segments:

the tangential discharge angle is within a range of between +/−30 degrees from the axial reference line; and the radial discharge angle is within a range between +/−30 degrees from the axial reference line.

18. The rotor blade according to claim 17, wherein, for each of the outlet segments:

the tangential discharge angle is within a range of between +/−10 degrees from the axial reference line; and the radial discharge angle is within a range between +/−10 degrees from the axial reference line.

19. The rotor blade according to claim 14, wherein:

a discharge direction for each comprises a direction in which a fluid being expelled therefrom travels;

an axial reference line comprises a reference line that is parallel to a central axis of the turbine and aimed toward the flow direction of the main working fluid through the turbine; and for each of the outlet segments, the discharge direction is approximately parallel to the axial reference line.

20. A gas turbine having a row of rotor blades in a turbine, the row of rotor blades comprising multiple rotor blades that each includes:

an airfoil defined between a concave pressure face and a laterally opposed convex suction face, wherein the pressure face and the suction face extend axially between opposite leading and trailing edges and radially between an outboard tip and an inboard end that attaches to a root configured to couple the rotor blade to a rotor disc;

a tip shroud is connected to the outboard tip of the airfoil, the tip shroud comprising an axially and circumferentially extending substantially planar component supported by the outboard tip of the airfoil;

a cooling configuration that includes multiple cooling channels for receiving and directing a coolant through an interior of the rotor blade, the cooling channels each including fluidly connected sequential segments in which:

a supply segment extends radially through the airfoil;

an outlet segment discharges the coolant from the rotor blade approximately parallel a flow direction of a main working fluid through the turbine, each of the outlet segments extending through an inboard fillet region formed between the pressure face of the airfoil and the tip shroud; and an elbow segment connects the supply segment to the outlet segment and is positioned at the outboard tip of the airfoil, the elbow segment configured for accommodating a change of direction between the supply segment and the outlet segment of between 80 and 100 degrees.

* * * * *